US012750110B2

(12) United States Patent
Wu et al.

(10) Patent No.: US 12,750,110 B2
(45) Date of Patent: Sep. 29, 2026

(54) CHANNEL STATE INFORMATION (CSI) REPORT CONFIGURATION FOR NETWORK SPATIAL ELEMENTS ADAPTATION

(71) Applicant: Apple Inc., Cupertino, CA (US)

(72) Inventors: Dan Wu, Beijing (CN); Hong He, San Jose, CA (US); Dawei Zhang, Saratoga, CA (US); Haitong Sun, Cupertino, CA (US); Sigen Ye, San Diego, CA (US); Wei Zeng, Saratoga, CA (US); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 362 days.

(21) Appl. No.: 18/605,426

(22) Filed: Mar. 14, 2024

(65) Prior Publication Data

US 2024/0333355 A1 Oct. 3, 2024

Related U.S. Application Data

(60) Provisional application No. 63/456,307, filed on Mar. 31, 2023.

(51) Int. Cl.
*H04B 7/06* (2006.01)
*H04W 72/23* (2023.01)

(52) U.S. Cl.
CPC .......... *H04B 7/0626* (2013.01); *H04W 72/23* (2023.01)

(58) Field of Classification Search
CPC ............................ H04B 7/0626; H04W 72/23
See application file for complete search history.

(56) References Cited

U.S. PATENT DOCUMENTS

| | | | |
|---|---|---|---|
| 2021/0158151 | A1 | 5/2021 | Wang et al. |
| 2022/0038349 | A1 | 2/2022 | Li et al. |
| 2022/0342713 | A1 | 10/2022 | Shen et al. |
| 2022/0360973 | A1 | 11/2022 | Zhu et al. |
| 2022/0400373 | A1 | 12/2022 | Zhu et al. |

FOREIGN PATENT DOCUMENTS

EP 3484057 A1 5/2019

OTHER PUBLICATIONS

International Search Report and the Written Opinion of the International Searching Authority, directed to related International Patent Application No. PCT/US2024/023679, mailed Jul. 18, 2024; 12 pages.

*Primary Examiner* — Blake J Rubin
(74) *Attorney, Agent, or Firm* — Sterne, Kessler, Goldstein & Fox P.L.L.C.

(57) ABSTRACT

Some aspects of this disclosure relate to apparatuses and methods for supporting channel state information (CSI) report configuration for network spatial elements adaptation. The UE can receive a CSI report configuration from the base station indicating a first configuration to configure a first CSI report, and a second configuration to configure a second CSI report. The UE can determine one or more active configurations selected from the first configuration and the second configuration, based on whether one or more of the first configuration or the second configuration is activated by a Medium Access Control (MAC) Control Element (MAC CE) or triggered by a Downlink Control Information (DCI). The processor can be further configured to select, based on a report mode, one or more CSI reports from the first CSI report and the second CSI report. The report mode can be a basic mode or an enhanced mode.

20 Claims, 9 Drawing Sheets

CHANNEL STATE INFORMATION (CSI) REPORT CONFIGURATION FOR NETWORK SPATIAL ELEMENTS ADAPTATION

RELATED APPLICATIONS

This application claims benefit of U.S. Provisional Patent Application No. 63/456,307 filed Mar. 31, 2023, the content of which is herein incorporated by references in its entirety.

BACKGROUND

Field

The described aspects generally relate to channel state information (CSI) reporting.

Related Art

A user equipment (UE) communicates with a base station, such as an evolved Node B (eNB), a next generation node B (gNB), or other base station, in a wireless communication network or system. A wireless communication system can include a fifth generation (5G) system, a New Radio (NR) system, a long term evolution (LTE) system, a combination thereof, or some other wireless systems. In addition, a wireless communication system can support a wide range of use cases such as enhanced mobile broad band (eMBB), massive machine type communications (mMTC), ultra-reliable and low-latency communications (URLLC), and enhanced vehicle to anything communications (eV2X). There are challenges in various technologies such as a NR wireless system.

SUMMARY

Some aspects of this disclosure relate to apparatuses and methods for implementing techniques for a user equipment (UE) or a base station to support channel state information (CSI) report configuration for network spatial elements adaptation in a wireless communication system. One CSI report configuration sent from a base station can include multiple configurations for multiple CSI reports, including a first configuration to configure a first CSI report, and a second configuration to configure a second CSI report corresponding to different spatial adaptions being applied by the base station. The implemented techniques can be applicable to many wireless systems, e.g., a wireless communication system based on 3rd Generation Partnership Project (3GPP) release 15 (Rel-15), release 16 (Rel-16), release 17 (Rel-17), release 18 (Rel-18), or beyond.

Some aspects of this disclosure relate to a UE. The UE may include a transceiver and a processor communicatively coupled to the transceiver. The transceiver can be configured to communicate with a base station. The processor can be configured to receive a CSI report configuration from the base station indicating a first configuration to configure a first CSI report, and a second configuration to configure a second CSI report. The first configuration and the second configuration may be referred to as a sub-configuration of the received CSI report configuration. In some embodiments, the first configuration indicates a first CSI report type indicating time-domain attributes for the first CSI report and a first CSI reference signal (CSI-RS) resource being monitored to generate the first CSI report, and the second configuration indicates a second CSI report type for the second CSI report and a second CSI-RS resource. The first CSI report can provide a first CSI feedback from the UE in response to a first spatial adaption being applied by the base station, and the second CSI report can provide a second CSI feedback in response to a second spatial adaption different from the first spatial adaption being applied by the base station.

In some embodiments, the first CSI report type can be a periodic report type, and the first CSI-RS resource and the second CSI-RS resource are periodic. The first CSI report type can be a semi-persistent report type, and the first CSI-RS resource and the second CSI-RS resource are periodic or semi-persistent. The first CSI report type can be an aperiodic report type, and the first CSI-RS resource and the second CSI-RS resource can be one of periodic, semi-persistent, or aperiodic.

In some embodiments, the processor can be further configured to determine one or more active configurations selected from the first configuration and the second configuration, based on whether one or more of the first configuration or the second configuration is activated by a Medium Access Control (MAC) Control Element (MAC CE) or triggered by a Downlink Control Information (DCI). The processor can be further configured to select, based on a report mode, one or more CSI reports from the first CSI report and the second CSI report. The report mode can be a basic mode, and the one or more selected CSI reports include both the first CSI report and the second CSI report. When the report mode is an enhanced mode, the one or more selected CSI reports can include only one of the first CSI report and the second CSI report, or both.

In addition, the processor can be further configured to monitor CSI-RS resources based on the one or more selected CSI reports to perform CSI-RS measurements configured by the one or more active configurations; generate the one or more selected CSI reports based on the CSI-RS measurements; and transmit the one or more selected CSI reports to the base station.

In some embodiments, the first CSI report type can be the periodic report type, and the one or more selected CSI reports can be transmitted periodically to the base station using a periodic CSI-RS resource. The first CSI report type can be the semi-persistent report type, and the processor can be configured to activate, based on the MAC CE, the first configuration or the second configuration for transmission of the one or more selected CSI reports. The first CSI report type can be an aperiodic report type, and the processor can be configured to trigger, based on the DCI, the first configuration or the second configuration for one-time transmission of the one or more selected CSI reports.

In some embodiments, the report mode can be an enhanced mode, and the one or more selected CSI reports include only the first CSI report selected by the UE, only the second CSI report selected by the UE, or both the first CSI report and the second CSI report selected by the UE. In some embodiments, when the one or more selected CSI reports include only the first CSI report selected by the UE, the processor can be configured to monitor only the first CSI-RS resource to generate the first CSI report without monitoring the second CSI-RS resource. In some embodiments, when the one or more selected CSI reports include only the second CSI report, the processor can be configured to monitor only the second CSI-RS resource to generate the second CSI report without monitoring the first CSI-RS resource.

In some embodiments, the first CSI report or the second CSI report can be further configured by a default configuration, and to determine the one or more active configurations, the processor can be configured to select from the default configuration, the first configuration, or the second configuration, based on whether the first configuration or the second configuration is activated by the MAC CE or triggered by the DCI. In some embodiments, the processor can be configured to select the default configuration as an active configuration when the first configuration or the second configuration is not activated by the MAC CE or triggered by the DCI. To monitor the CSI-RS resources, the processor can be configured to monitor CSI-RS resources configured by the default configuration. When the first configuration is activated by the MAC CE or triggered by the DCI, the processor can be configured to determine the first configuration as the active configuration, and monitor a CSI-RS resource configured by the first configuration instead of the default configuration.

In some embodiments, the CSI processing unit (CPU) occupancy is counted based on the one or more active configurations selected from the first configuration or the second configuration.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1A:
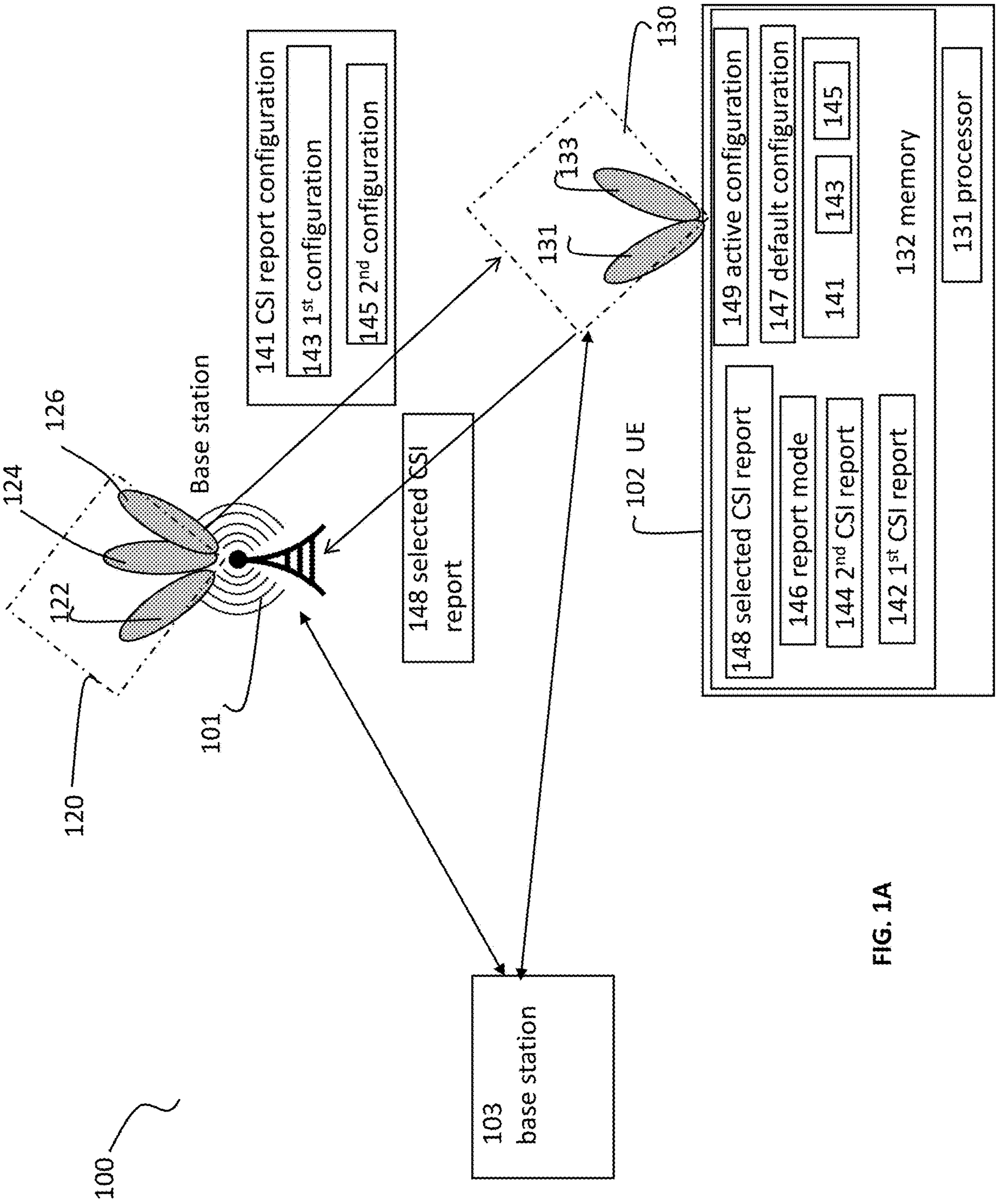
FIGS. 1A-1C illustrate an example wireless system supporting one channel state information (CSI) report configuration received from the base station including multiple configurations for multiple CSI reports, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless communication network or system, a user equipment (UE) communicates with a base station through a communication channel, where a base station can be referred to as a network node as well, such as an evolved Node B (eNB), a next generation node B (gNB), or other base station. A wireless communication system can include a fifth generation (5G) system, a New Radio (NR) system, a long term evolution (LTE) system, a combination thereof, or some other wireless systems. In a wireless system, multiple input-multiple output (MIMO) transmission can be an important technology. A UE or a base station can include an antenna array or system having a plurality of antenna panels coupled to antenna ports, where an antenna panel can include an array of antenna elements that can be located in close physical location to each other. In some examples, an antenna can be a smart antenna system, where all antenna elements are considered as pseudo-omni or quasi-sector-omni antenna elements including a phase shifter. A directional beam, such as a transmission (Tx) beam or a receiving (Rx) beam, can be formed by adjusting the phase shifter of the antenna element. In a wireless system, channel state information (CSI) reports can provide the network with information about the channel conditions between a UE and a base station.

It is important to reduce the energy consumption in wireless communication networks. Energy use may be reduced on both the UE side and the network node or base station side. To save energy, a base station may use spatial element adaptation to change the configuration of antenna elements being used in communication. In some embodiments, an antenna element may be referred to as a spatial element as well. A base station may disable spatial elements associated with logical antenna ports. Spatial element adaptation may be referred to as transceiver unit (TxRU) reduction because it may limit the number of TxRUs that the base station uses. A base station may control spatial elements at a port level or at the receiver unit level, which can change the CSI-Reference Signal (RS) being transmitted. For example, when the base station disables all the antenna elements associated with an antenna port, the UE may only measure the CSI-RS from the subset of antenna elements of enabled antenna ports. Different channel state information (CSI) report configurations may be provided to the UE for monitoring CSI-RS resources corresponding to the enabled antenna elements determined by the spatial element adaptation. Based on the CSI report configuration provided by the base station, the UE can perform CSI-RS measurements configured by the CSI report configurations, generate CSI reports based on the CSI-RS measurements, and transmit the CSI reports to the base station.

Embodiments herein may specify enhancements on CSI reporting and beam management related procedures (e.g., measurement, reporting, and signaling) to enable efficient adaptation of spatial elements (e.g. antenna ports, active transceiver chains) by a base station. Since the maximum number of CSI report configurations received by a UE from a base station can be limited by UE capability, multiple CSI reports reflecting the effect of spatial elements adaptation can be considered within one CSI report configuration transmitted from the base station. In some embodiments, a basic multi-CSI resource configuration can be defined and transmitted from the base station, where a CSI-RS resource/resource set/resource setting can be associated with one or more spatial adaptation patterns. In doing so, the base station can reduce the number of CSI report configurations received by the UE, meeting the constraints of the UE for the maximum number of CSI report configurations received.

In addition, the multiple CSI reports can have varying time-domain behavior or attribute. Accordingly, embodiments herein provide techniques to support the multiple CSI reports with different time-domain behavior or attribute including one of periodic, semi-persistent, or aperiodic report. Once a periodic report configuration is configured by a Radio Resource Control (RRC) message, the CSI reports can be sent periodically to the base station using the pre-allocated resource. A semi-persistent report configuration can be first configured by a RRC message, and further activated by Medium Access Control (MAC) Control Element (MAC CE) for transmission. An aperiodic report configuration can be first configured by a RRC message, and further triggered by Downlink Control Information (DCI) for one-time transmission. In some embodiments, MAC CE could also be used to select a subset of states from the RRC configured states, and DCI can trigger to use one of the states.

Embodiments herein can provide in details the CSI report configurations to support multi-CSI reports with flexibility in determining which and when to send CSI reports to save UE complexity. In some embodiments, each CSI report corresponds to one spatial adaptation pattern determined by the base station. Accordingly, one CSI report configuration received from the base station can contain multiple CSI report sub-configurations where each sub-configuration corresponds to one spatial adaptation pattern. In some embodiments, a base station can indicate to the UE which one or more CSI reports the UE may generate and transmit to the base station. In some other embodiments, the UE can select which one or more CSI reports are generated and transmitted by the UE to the base station. In some embodiments, multiple CSI reports can be generated and included in a joint CSI report, which can provide further overhead reduction for CSI reports.

In some embodiments, the UE can generate and transmit multiple CSI reports corresponding to different spatial adaptation patterns by the base station under different report mode such as a basic mode or an enhanced mode. In some embodiments, under the basic mode, multiple report sub-configurations can be configured in the same CSI report configuration with same time-domain behavior, and all CSI reports are transmitted back to the base station when configured, activated, or triggered. In some embodiments, under the enhanced mode, even when multiple report sub-configurations are configured in the same CSI report configuration with same time-domain behavior, which report is to be the feedback to the base station is further determined by indication.

Figure 1C:
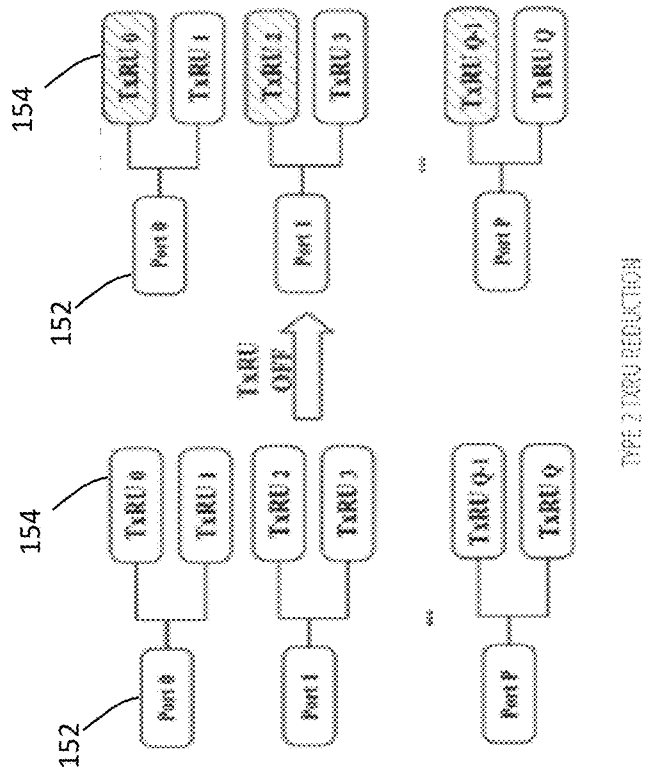
Figure 1B:
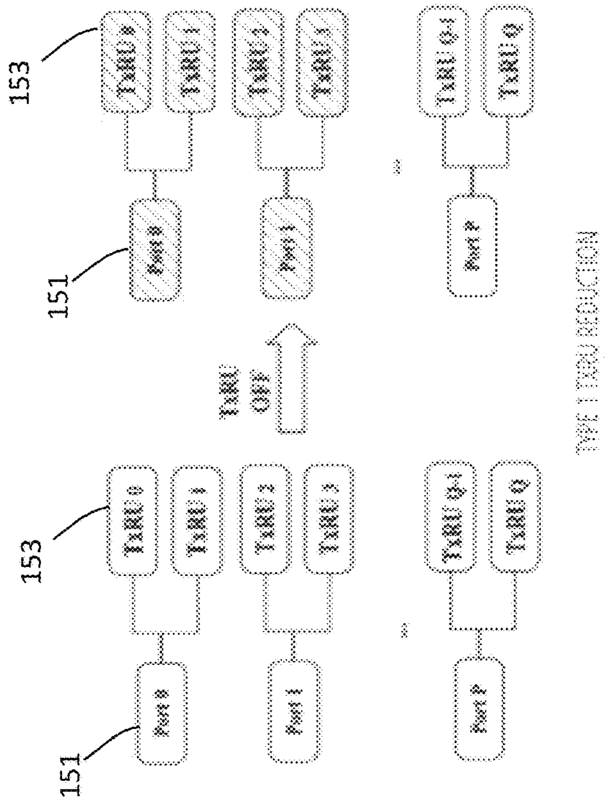

FIGS. 1A-1C illustrate an example wireless system 100 supporting one CSI report configuration received from the base station including multiple configurations for multiple CSI reports, according to some aspects of the disclosure. The wireless system 100 is provided for the purpose of illustration only and does not limit the disclosed aspects. As shown in FIG. 1A, system 100 can include, but is not limited to, a network node (herein referred to as a base station) 101, another base station 103, and one or more UEs, such as a UE 102. System 100 can further include additional components, not shown.

According to some aspects, a base station, such as base station 101 or base station 103, can include a network node configured to operate based on a wide variety of wireless communication techniques such as, but not limited to, techniques based on 3rd Generation Partnership Project (3GPP) standards. For example, base station 101 can include a node configured to operate using Rel-16, Rel-17, or others. The base station 101 can be a fixed station, and may also be called a base transceiver system (BTS), an access point (AP), a transmission/reception point (TRP), an evolved NodeB (eNB), a next generation node B (gNB), a network node, or some other equivalent terminology. The system 100 can operate using both licensed cellular spectrum (known as in-band communication) and unlicensed spectrum (known as out-band communication).

According to some aspects, UE 102 can be configured to operate based on a wide variety of wireless communication techniques. These techniques can include, but are not limited to, techniques based on 3GPP standards. For example, UE 102 can be configured to operate using Rel-16, Rel-17 or later. UE 102 can include, but is not limited to, a wireless communication device, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, or the like.

According to some aspects, UE 102 can include an antenna array or system 130 having a plurality of antenna panels, and base station 101 can include an antenna array or system 120 having a plurality of antenna panels. In general, an antenna system can include one or more antenna panels. An antenna panel can include an array of antenna elements that can be located in close physical location to each other. An antenna element can be an omnidirectional antenna element, a quasi-omnidirectional antenna element, a directional antenna element, or any other antenna element. In some examples, an antenna panel can be a smart antenna system, where all antenna elements are considered as pseudo-omni or quasi-sector-omni antenna elements and include a phase shifter. A directional beam, such as a transmission (Tx) beam or a receiving (Rx) beam, can be formed by adjusting the phase shifter of one or more of the antenna elements. Accordingly, antenna system 120 can provide corresponding antenna beam (herein "beam") 122, beam 124, beam 126 for base station 101, and antenna system 130 can provide corresponding beam 131 and beam 133 for UE 102. In some examples, there can be more or fewer antenna panels, and an antenna panel can include 2, 4, 8, 16, or other number of antenna elements, which can include a dipole antenna element, a monopole antenna element, a patch antenna element, a loop antenna element, a microstrip antenna element, or any other type of antenna elements suitable for transmission of RF signals.

In some embodiments, more details of base station 101 and antenna system 120 are shown in FIGS. 1B and 1C. FIG. 1B illustrates type 1 TxRU reduction. Type 1 TxRU reduction allows base station 101 to enable/disable all spatial elements (e.g., TxRUs 153) associated to a logical antenna port (e.g., ports 151). Base station 101 may enable and/or disable a subset of ports of a CSI-RS resource.

In the illustrated example in FIG. 1B, base station 101 disables Port 0 and Port 1 and enables Port P. By disabling Port 0 and Port 1, base station 101 disables all the antenna elements associated with Port 0 and Port 1 which includes TxRU 0, TxRU 1, TxRU 2, TxRU 3. CSI-RS can only be transmitted from a subset of antenna elements of enabled antenna ports, such as Port P, and UE 102 would then measure the CSI-RS from the subset of enabled antenna ports.

FIG. 1C illustrates type 2 TxRU reduction. Type 2 TxRU reduction allows base station 101 to enable/disable part of the spatial elements (e.g., TxRUs 154) associated to a logical antenna port (e.g., ports 152). For example, antenna element TxRU 0 associated with Port 0 and antenna element TxRU 2 associated with Port 1 are disabled, while antenna element TxRU 1 associated with Port 0 and antenna element TxRU 3 associated with Port 1 are enabled. The enabled antenna element patterns, such as TxRU 1 and TxRU 3 may result in changes to the antenna pattern, gains, TCI states, and/or transmission power of the reference signal or channel that uses the antenna port(s). UE 102 may measure the CSI-RS sent from the enabled antenna elements. The measurements may be different than CSI-RS sent from all TxRUs because of the change in the spatial filter. The TxRU reduction for CSI-RS allows for accurate measurements that may be used by base station 101 for future transmissions using a reduced number of ports or TxRUs.

As these different types of TxRU reductions may result in different CSI-RS being transmitted by the base station, it may be desirable to support multiple CSI reports. A multi-CSI report may include additional CSI reports reflecting the effect of spatial elements adaptation. Some embodiments herein provide details of the resource configurations and related report configurations to support multi-CSI report for the above Type 1 and Type 2 spatial elements adaptation shown in FIGS. 1B-1C.

According to some aspects, referring back to FIG. 1A, UE 102 can include a transceiver coupled to the antenna system 130, a processor 131, and a memory 132 communicatively coupled to transceiver. The transceiver can be configured to wirelessly communicate with base station 101 and base station 103 using antenna system 130.

In some embodiments, processor 131 receives a CSI report configuration 141 indicating a first configuration 143 to configure a first CSI report 142, and a second configuration 145 to configure a second CSI report 144. In some embodiments, the first configuration 143 indicates a first CSI report type indicating time-domain attributes for the first CSI report 142 and a first CSI reference signal (CSI-RS) resource to be monitored to generate the first CSI report 142, and the second configuration 145 indicates a second CSI report type for the second CSI report 144 and a second CSI-RS resource. The first CSI report 142 can provide a first CSI feedback from UE 102 in response to a first spatial adaption being applied by base station 101, and the second CSI report 144 can provide a second CSI feedback in response to a second spatial adaption different from the first spatial adaption being applied by base station 101. For example, the first spatial adaption being applied by base station 101 may be shown in FIG. 1B, and the second spatial adaption being applied by base station 101 may be shown in FIG. 1C.

In some embodiments, the first CSI report type can be a periodic report type, and the first CSI-RS resource and the second CSI-RS resource are periodic. Alternatively, the first CSI report type can be a semi-persistent report type, and the first CSI-RS resource and the second CSI-RS resource are periodic or semi-persistent. Alternatively, the first CSI report type can be an aperiodic report type, and the first CSI-RS resource and the second CSI-RS resource are one of periodic, semi-persistent, or aperiodic.

In some embodiments, processor 131 determines one or more active configurations 149 selected from the first configuration 143 and the second configuration 145, based on whether one or more of the first configuration 143 or the second configuration 145 is activated by a MAC CE or triggered by a DCI. Processor 131 can further select, based on a report mode 146, one or more CSI reports 148 from the first CSI report 142 and the second CSI report 144. The report mode 146 can be a basic mode, and the one or more selected CSI reports 148 include both the first CSI report and the second CSI report. When report mode 146 is an enhanced mode, the one or more selected CSI reports 148 can include only one of the first CSI report and the second CSI report, or both.

In embodiments, processor 131 can monitor CSI-RS resources based on the one or more selected CSI reports 148 to perform CSI-RS measurements configured by the one or more active configurations 149. The processor 131 can generate the one or more selected CSI reports 148 based on the CSI-RS measurements, and transmit (or cause the UE to transmit) the one or more selected CSI reports 148 to base station 101.

In some embodiments, the first CSI report type can be the periodic report type, the one or more selected CSI reports 148 can be transmitted periodically to base station 101 using a periodic CSI-RS resource. The first CSI report type can be the semi-persistent report type, and processor 131 can activate, based on the MAC CE, the first configuration 143 or the second configuration 145 for transmission of the one or more selected CSI reports 148. The first CSI report type can be an aperiodic report type, and processor 131 can trigger, based on the DCI, the first configuration 143 or the second configuration 145 for one-time transmission of the one or more selected CSI reports 148.

In some embodiments, report mode 146 can be an enhanced mode, and the one or more selected CSI reports 148 can include only the first CSI report 142 selected by UE 102, only the second CSI report 144 selected by UE 102, or both the first CSI report 142 and the second CSI report 144 selected by UE 102. In some embodiments, when the one or more selected CSI reports 148 include only the first CSI report 142 selected by UE 102, processor 131 can monitor only the first CSI-RS resource to generate the first CSI report 142 without monitoring the second CSI-RS resource. In some embodiments, when the one or more selected CSI reports 148 include only the second CSI report 144, processor 131 can monitor only the second CSI-RS resource to generate the second CSI report 144 without monitoring the first CSI-RS resource.

In some embodiments, the first CSI report 142 or the second CSI report 144 can be based on a default configuration 147, and to determine the one or more active configurations 149, processor 131 can select from the default configuration 147, the first configuration 143, or the second configuration 145, based on whether the first configuration 143 or the second configuration 145 is activated by the MAC CE or triggered by the DCI. In some embodiments, processor 131 can select the default configuration 147 as an active configuration 149 when the first configuration 143 or the second configuration 145 is not activated by the MAC CE or triggered by the DCI. To monitor the CSI-RS resources, processor 131 can monitor a CSI-RS resource configured by the default configuration 147. When the first configuration 143 is activated by the MAC CE or triggered by the DCI, processor 131 can determine the first configuration 143 as the active configuration 149, and monitor a CSI-RS resource configured by the first configuration 143 instead of the default configuration 147.

In some embodiments, processor 131 can determine the CSI processing unit (CPU) occupancy $O_{CPU}$ based on the one or more active configurations 149 selected from the first configuration 143, the second configuration 145, or the default configuration 147. If UE 102 can support $N_{CPU}$ simultaneous CSI calculations, UE 102 has $N_{CPU}$ CSI processing units for processing CSI reports. If L CPUs are occupied for calculation of CSI reports in a given OFDM symbol, UE 102 has $N_{CPU}$–L unoccupied CPUs. If N CSI reports start occupying their respective CPUs on the same OFDM symbol on which $N_{CPU}$−L CPUs are unoccupied, where each CSI report n=0, . . . , N−1 corresponds to $$O_{CPU}^{(n)}$$

UE 102 is not required to update the N−M requested CSI reports with lowest priority, where 0≤M≤N is the largest value such that $$\sum_{n=0}^{M-1} O_{CPU}^{(n)}$$

≤$N_{CPU}$−L holds. Each active configuration will be considered as an individual CSI report when calculating CPU occupancy.

In some embodiments, a CSI report, such as the first CSI report 142 or the second CSI report 144, can include one or several pieces of information, such as Rank indicator (RI), Precoder matrix indicator (PMI), Channel-quality indicator (CQI), CSI-RS resource indicator (CRI), or other CSI information such as Layer Indicator (LI), SS/PBCH Resource Block Indicator (SSBRI). The RI can provide a recommendation on the transmission rank to use or, expressed differently, the number of layers that should preferably be used for Downlink Shared Channel (DL-SCH) transmission to UE 102. The PMI can indicate a preferred precoder to use for DL-SCH transmission, conditioned on the number of layers indicated by the RI. The precoder recommended by the UE is not explicitly signaled, but is provided as an index into a set of predefined matrices, a so-called codebook. The CQI can represent the highest modulation-and-coding scheme that, if used, would mean a DL-SCH transmission using the recommended RI and PMI would be received with a block-error probability of at most 10%. The CRI can indicate the beam the UE prefers in case the UE is configured to monitor multiple beams. Together, a combination of the RI, PMI, CQI, and CRI can be included in a CSI report. Exactly what is included in a CSI report may depend on the reporting mode the UE is configured to be in. For example, RI and PMI do not need to be reported unless the UE 101 is in a spatial-multiplexing transmission mode.

In some embodiments, the CSI report configuration 141 can include various parameters such as a reportConfig parameter, codebookConfig parameter, or a reportConfigType parameter to define a type of CSI-report, and a ResourceConfig parameter to define corresponding CSI-RS resources to be monitored to generate the CSI report. When CSI report configuration 141 includes the first configuration 143 and the second configuration 145, CSI report configuration 141 can include a first codebookConfig or reportConfigType parameter included in the first configuration 143 to indicate the CSI report type for the first CSI report 142, and a second codebookConfig or reportConfigType parameter included in the second configuration 145 to indicate the CSI report type for the second CSI report 144. Such a design of CSI report configuration 141 can be different from transmitting the first configuration 143 and the second configuration 145 separately. When the first configuration 143 or the second configuration 145 is transmitted separately, the first configuration 143 or the second configuration 145 includes only one codebookConfig and reportConfigType parameter, while CSI report configuration 141 includes two codebookConfig or reportConfigType parameters.

In some embodiments, for CSI report configuration 141, the first configuration 143, and the second configuration 145, the allowed reportConfigType and corresponding resource Types can be summarized in the following. For reportConfigType=periodic (P), the corresponding resource types for (CSI-RS Resource for the first CSI report 142, Additional CSI-RS Resource for the second CSI report 144) can be (P,P) only. For reportConfigType=semi-persistent (SP) on PUCCH/PUSCH, the corresponding resource types for (CSI-RS Resource for the first CSI report 142, Additional CSI-RS Resource for the second CSI report 144) can be (P,P), (SP,SP) or (P,SP). For reportConfigType=aperiodic (AP), the corresponding resource types for (CSI-RS Resource for the first CSI report 142, Additional CSI-RS Resource for the second CSI report 144) can be (P,P), (SP,SP), (AP,AP), (P,SP), (P,AP), (SP,AP).

Figure 2:
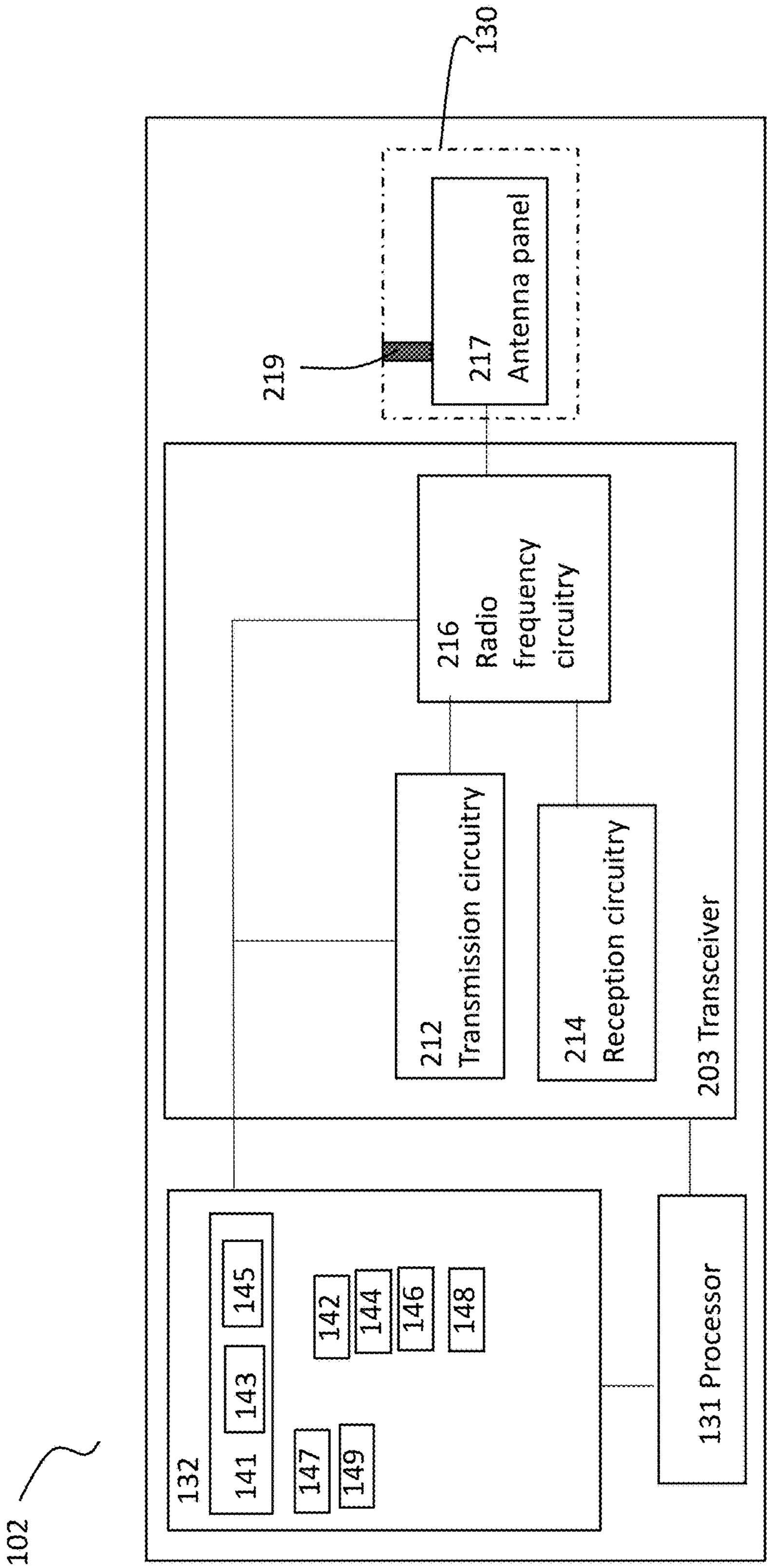
FIG. 2 illustrates a block diagram of a UE implementing support for one CSI report configuration received from the base station including multiple configurations for multiple CSI reports in a wireless communication system, according to some aspects of the disclosure.

According to some aspects, UE 102 can be implemented according to a block diagram as illustrated in FIG. 2.

Referring to FIG. 2, UE 102 can have antenna system 130 including one or more antenna elements 219 of antenna panel 217 to form various beams, e.g., beam 131, or beam 133, coupled to transceiver 203 and controlled by processor 131. Transceiver 203 and antenna system 130 can enable wireless communication in a wireless network, such as wireless system 100, including wireless communication with base station 101. In detail, transceiver 203 can include radio frequency (RF) circuitry 216, transmission circuitry 212, and reception circuitry 214 to enable wireless communication with other UEs and/or a base station as discussed for wireless system 100. RF circuitry 216 can include multiple parallel RF chains for one or more of transmit or receive functions, each connected to one or more antenna elements of the antenna panel. In addition, processor 131 can be communicatively coupled to memory 132, which are further coupled to the transceiver 203. Various data can be stored in memory 132. In some examples, memory 132 can store CSI report configuration 141, the first configuration 143, the first CSI report 142, the second configuration 145, the second CSI report 144, default configuration 147, active configurations 149, report mode 146, and selected CSI report 148.

In some embodiments, memory 132 can store instructions, that when executed by processor 131 perform or cause to perform operations described herein, e.g., operations to support one channel state information (CSI) report configuration received from the base station including multiple configurations for multiple CSI reports. Alternatively, processor 131 can be "hard-coded" to perform the operations described herein. In some embodiments, processor 131 can be configured to perform operations described for FIG. 3.

Figure 3:
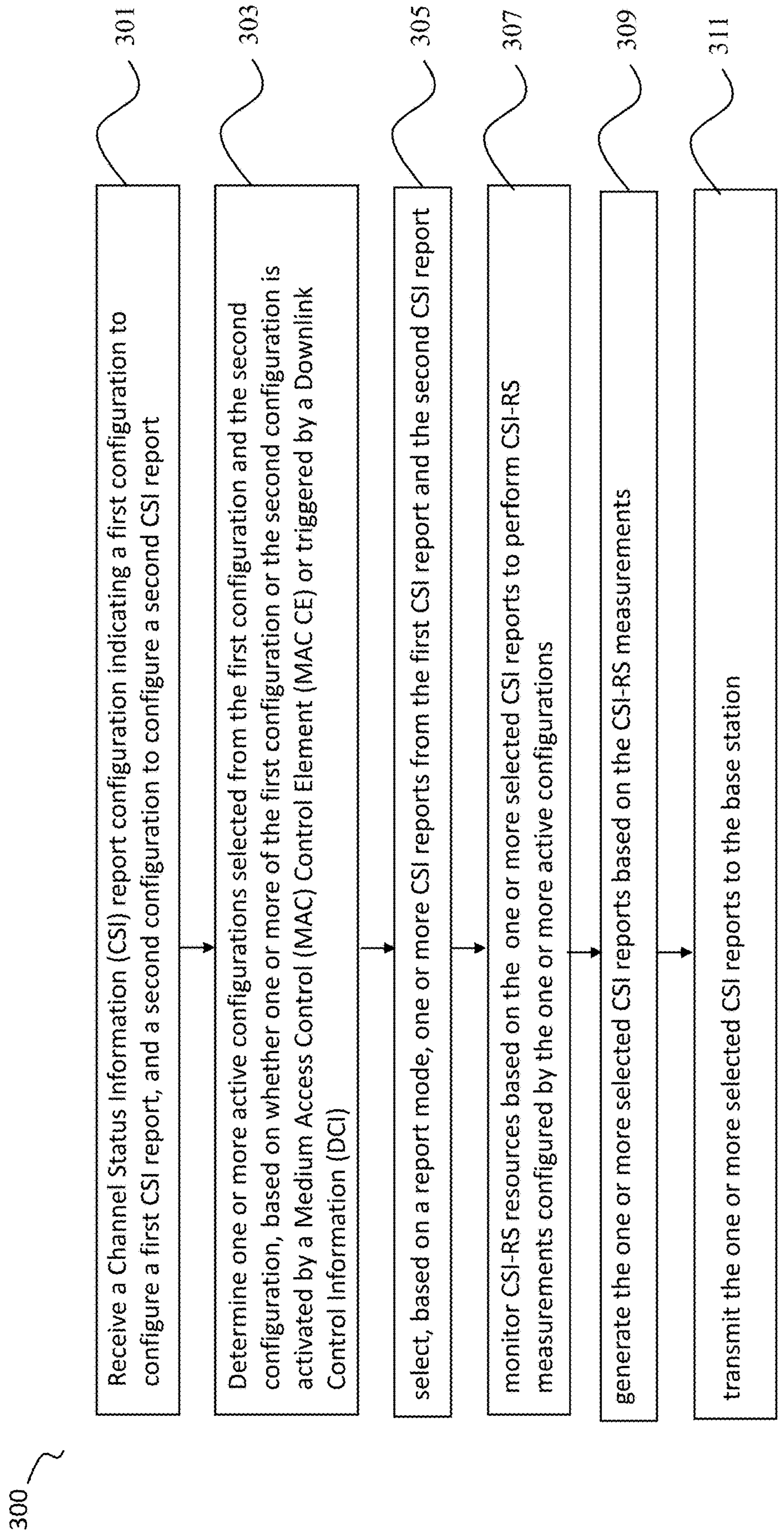
FIG. 3 illustrates an example process performed by a UE supporting one CSI report configuration received from the base station including multiple configurations for multiple CSI reports in a wireless communication system, according to some aspects of the disclosure.

FIG. 3 illustrates an example process 300 performed by UE 102 supporting one CSI report configuration received from the base station including multiple configurations for multiple CSI reports, according to some aspects of the disclosure. Process 300 can be performed by UE 102, which may be implemented as shown in FIG. 2. Process 300 may also be performed by a computer system 500 of FIG. 5. Process 300 is not limited to the specific aspects depicted in those figures and other systems may be used to perform the method as will be understood by those skilled in the art. It is to be appreciated that not all operations may be needed, and the operations may not be performed in the same order as shown in process 300.

At 301, processor 131 of UE 102 can receive, from base station 101, CSI report configuration 141 indicating the first configuration 143 to configure the first CSI report 142, and the second configuration 145 to configure the second CSI report 144. Both the first configuration 143 and the second configuration 145 may be a sub-configuration of CSI report configuration 141, which is transmitted by base station 101 together at one time. In some embodiments, UE 101 can have a constraint on how many CSI report configurations or the maximum number of CSI report configurations it can receive from base station 101. UE 101 can receive CSI report configuration 141, which carries two different configurations, the first configuration 143 and the second configuration 145. In doing so, UE 101 can reduce the number of CSI report configurations received. An alternative solution would be to transmit the first configuration 143 and the second configuration 145 separately by base station 101, and UE 102 receives the first configuration 143 and the second configuration 145 as two separate CSI report configurations. Receiving two such separate CSI configurations would cost more to the UE due to the constraint on the maximum number of CSI report configurations that can be received. In addition to first configuration 141 and second configuration 143, the CSI report configuration 141 can contain additional parameters, such as two reportConfigType parameters indicating the report type for the first CSI report 142 and the report type for the second CSI report 144.

In some embodiments, the first configuration 143 can indicate a first CSI report type by a parameter reportConfigType indicating time-domain attributes for the first CSI report 142, and a first CSI-RS resource to be monitored to generate the first CSI report 142 that is indicated by a parameter ResourceConfig. The time domain attributes include one of periodic, semi-persistent, or aperiodic report. Similarly, the second configuration 145 can indicate a second CSI report type by a parameter reportConfigType for the second CSI report 144, and a second CSI-RS resource to be monitored to generate the second CSI report 144 that is indicated by a parameter ResourceConfig. In some embodiments, there may be a correspondence between the parameter reportConfigType of the first configuration 143 and the parameter reportConfigType of the second configuration 145. For example, in some embodiments, when the report mode is the basic mode, the parameter reportConfigType of the first configuration 143 and the parameter reportConfigType of the second configuration 145 are the same. When the report mode is the enhanced mode, the parameter reportConfigType of the first configuration 143 and the parameter reportConfigType of the second configuration 145 can be different.

At 303, processor 131 of UE 102 can determine one or more active configurations 149 selected from the first configuration 143 and the second configuration 145, based on whether one or more of the first configuration 143 or the second configuration 145 is activated by a MAC CE or triggered by a DCI. Accordingly, the first configuration 143 and the second configuration 145 can be configured by a RRC message, but may not be activated. In order for UE 102 to use the first configuration 143 or the second configuration 145, in some embodiments, the first configuration 143 or the second configuration 145 has to be activated first to become an active configurations 149. In some embodiments, there can be a default configuration that can be used by UE 102 when the first configuration 143 and the second configuration 145 are not activated.

At 305, processor 131 of UE 102 can select, based on report mode 146, one or more CSI reports 148 from the first CSI report 142 and the second CSI report 144. In some embodiments, even when both the first CSI report 142 and the second CSI report 144 are configured by the first configuration 143 and the second configuration 145, respectively, if UE 102 selects only one CSI report of the first CSI report 142 and the second CSI report 144, the other not selected CSI report does not need to be generated. In addition, in some report mode, UE 102 can select both the first CSI report 142 and the second CSI report 144 to be generated.

At 307, processor 131 of UE 102 can monitor CSI-RS resources based on the one or more selected CSI reports 148 to perform CSI-RS measurements configured by the one or more active configurations 149.

At 309, processor 131 of UE 102 can generate the one or more selected CSI reports 148 based on the CSI-RS measurements.

At 311, processor 131 of UE 102 can transmit the one or more selected CSI reports 148 to base station 101.

In some embodiment, when report mode 146 is the basic mode, the first configuration 143 and the second configuration 145 can be configured by the same CSI report configuration 141 with same time-domain behavior, and both the first CSI report 142 and the second CSI report 144 are fed back to base station 101 when configured, activated, or triggered. In this mode, the allowed reportConfigType and corresponding resource Types can be summarized in the following. For reportConfigType=periodic (P), the corresponding resource types for all the CSI-RS resources related to these sub-configurations can be Periodic only. For reportConfigType=semi-persistent (SP) on PUCCH/PUSCH, the corresponding resource types can be P only, SP only, or P and SP combined. For reportConfigType=aperiodic (AP), the corresponding resource types can be P only, SP only, AP only or any combination. Once the reportConfig is configured, activated, or triggered, the corresponding CSI-RS resources can all be transmitted, activated, or triggered, then the CSI reports corresponding to the multiple spatial adaptation patterns will be fed back to base station 101 in the same reporting instance. In some embodiments, for a report containing multiple sub-configurations for channel measurement, $O_{CPU}$ can be counted per sub-configuration.

Accordingly, when report mode 146 is the basic mode, UE 102 can measure on multiple CSI-RS resources or compute CSI based on multiple assumptions. As a result, UE 102 can have redundant report overhead, since once the report is configured, activated, triggered, these multiple reports may be sent to base station 101. Such redundant report overhead can cause inefficiency.

In embodiments, when report mode 146 is the enhance mode, UE 102 can have more flexibility on which reports are to be transmitted to base station 101 to save UE complexity and energy. In some embodiments, when report mode 146 is the enhanced mode, the first configuration 143 and the second configuration 145 can be configured with the same time-domain behavior, but which report is fed back can be indicated by the base station to select the one or more CSI reports 148. In some embodiments, the first configuration 143 and the second configuration 145 can be configured with different time-domain behavior.

In some embodiment, when report mode 146 is the enhance mode, UE 102 can have multiple CSI report sub-configurations, such as the first configuration 143 and the second configuration 145, being configured in the same CSI report configuration 141 with same time-domain behavior, such as having a same reportConfig parameter. In some embodiments, multiple CSI reports can be configured by a same reportConfig parameter of a shared configuration instead of different sub-configurations. In addition, UE 102 can be indicated of which CSI report, either the first CSI report 142, the second CSI report 144, or both, to be transmitted to base station 101.

In some embodiments, when report mode 146 is the enhance mode, if reportConfigType=periodic, the corresponding resource types for all the CSI-RS resources related to these sub-configurations can be Periodic only. For the report in the enhanced mode, MAC CE or DCI could be used to indicate which CSI result will be reported. A default sub-configuration, such as default configuration 147, can be defined. When there are no other active sub configurations indicated by MAC CE or DCI, UE 102 can transmit a CSI report based on the default sub-configuration. For a periodic reporting configuration, UE 102 can report periodically without any further indication. The default sub-configuration can be predetermined, either by a specification that controls UE 102 operations, or configured by a RRC message sent from base station 101. The default sub-configuration can be in effect for a longer time in comparison with other configurations such as the first configuration 143 and the second configuration 145.

In some embodiments, in Option 1, when report mode 146 is the enhance mode, UE 102 can report one CSI result to base station 101 in one report instance. For example, MAC CE or DCI can indicate only one report sub-configuration, e.g., one of the first configuration 143 and the second configuration 145, for reporting is allowed, where the previous report is automatically deactivated by the newly indicated report. $O_{CPU}$ is counted per report configuration.

In some embodiments, in Option 2, when report mode 146 is the enhance mode, UE 102 can report one CSI result to base station 101 in one report instance. However, MAC CE or DCI could also indicate multiple consecutive CSI results, so that UE 102 can report them in consecutive reporting instances. $O_{CPU}$ is counted per report configuration.

In some embodiments, in Option 3, when report mode 146 is the enhance mode, UE 102 can report multiple CSI reports in one report instance, where the exact number can be limited by M. UE 102 will measure or compute simultaneously for at most M report sub-configurations, where M can be the maximum number of sub-configurations included in CSI report configuration 141. $O_{CPU}$ is counted per activated sub-configuration. In some embodiments, the multiple CSI reports can have same time domain attributes that are configured by a same reportConfig parameter, instead of being configured by individual separated sub-configurations.

In some embodiments, for Options 1 & 2, UE 102 may not measure or compute simultaneously for multiple report sub-configurations, such as the first configuration 143 and the second configuration 145.

In some embodiments, transition time for Option 1 can be defined as the time duration between the indication of the report and the PUCCH/PUSCH transmission carrying the next report. In some embodiments, the transition time for Option 1 may at least include the time that allows UE 102 to perform N times of CSI-RS measurements and CSI computation, where N is greater than or equal to 1.

In some embodiments, transition time for Option 2 can be defined as the time duration between the indication of the report/the end of previous report and the PUCCH/PUSCH transmission carrying the next report. In some embodiments, the transition time for Option 2 may at least include the time that allows UE 102 to perform N times of CSI-RS measurements, where N is greater than or equal to 1.

In some embodiments, during the transition time, UE 102 may report the previous CSI results, or stop reporting. In addition, the duration of the CSI report can be also indicated by the MAC CE or DCI, UE 102 can resume to the default sub-configuration after this time without further deactivation.

In some embodiments, UE 102 may monitor at most 1 (for option 1 & 2) or multiple number, e.g., M (for option 3), CSI-RS reporting resources configured by the sub-configurations including the default configuration (if configured). UE 102 may not monitor the corresponding CSI-RS resource, if the report sub-configuration is not a default sub-configuration and is not indicated to be reported. For the default configuration, UE 102 monitors corresponding CSI-RS resources when there are no other sub-configurations that need to be reported (for option 1) or when the number of sub-configurations that need to be reported is no larger than M−1 (for option 3). $O_{CPU}$ is counted per activated sub-configuration for option 3.

Figure 4A:
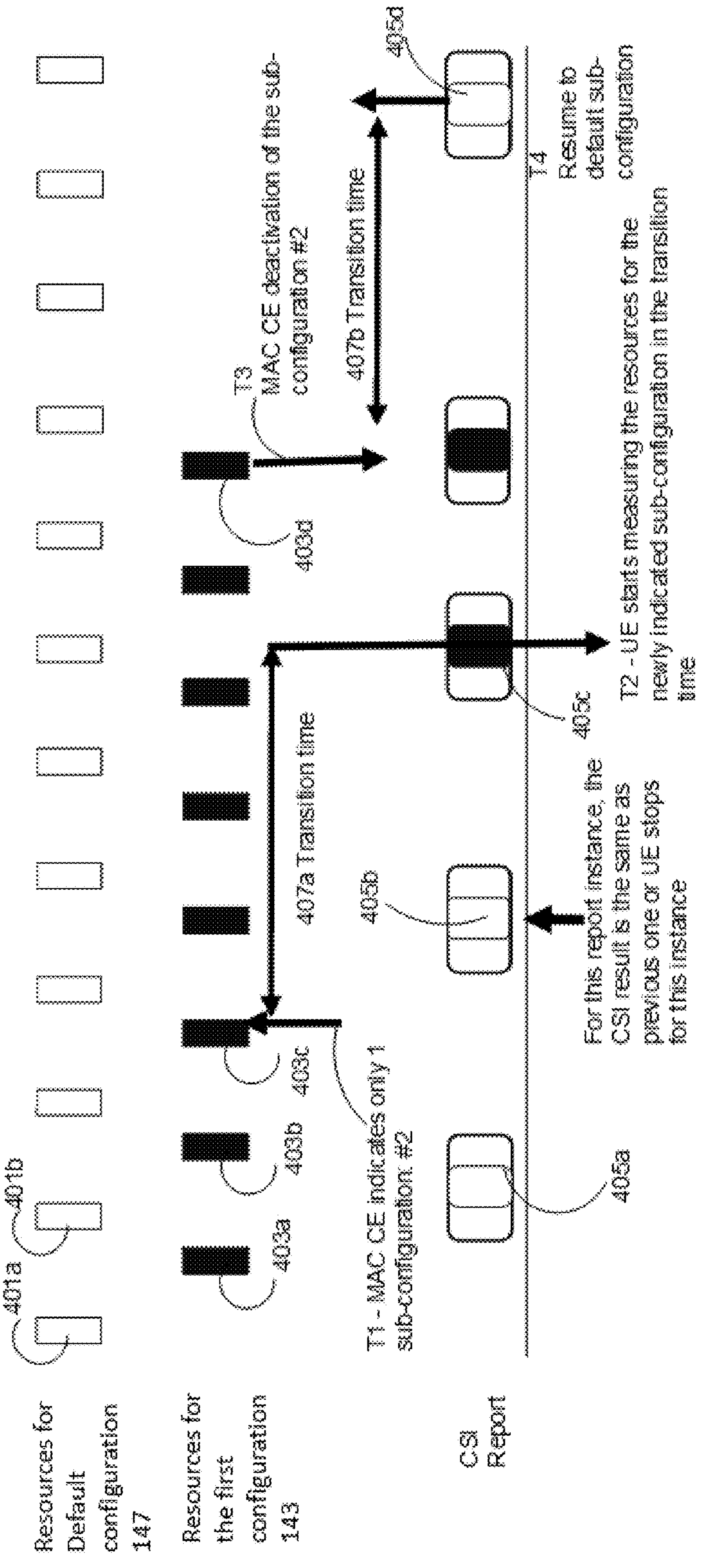
FIGS. 4A-4D illustrate example processes performed by a UE supporting one CSI report configuration received from the base station including multiple configurations for multiple CSI reports in a wireless communication system, according to some aspects of the disclosure.

In some embodiments, as shown in FIG. 4A, various CSI-RS resources 401*a*, 401*b*, . . . , can be configured by default configuration 147, and CSI-RS resources 403*a*, 403*b*, . . . can be configured by the first configuration 143. CSI-RS resources 401*a*, 401*b*, linked to the default report sub-configuration #1, which is default configuration 147, is a Periodic type. Similarly, CSI-RS resources 403*a*, 403*b*, linked to sub-configuration #2, which is the first configuration 143, is also a Periodic type. Initially, CSI-RS resources 403*a*, 403*b*, . . . , are configured by the first configuration 143 but not activated until a time instance T1. At time instance T1, a MAC CE indicates the first configuration 143 is activated. Accordingly, the CSI report, such as CSI report 405*a*, 405*b*, transmitted by UE 102 to base station 101 is initially configured by default configuration 147. CSI-RS resources 403*c* is activated at time instance T1. After a transition time 407*a*, at time instance T2, UE 102 completes the measuring of the CSI-resource 403*c*, and generates a CSI report 405*c* to be transmitted by UE 102 to base station 101. Furthermore, CSI-RS resources 403*d* can be deactivated at time instance T3. After a transition time 407*b*, at time instance T4, CSI report 405*d* can be generated based on a CSI resource configured by the default configuration 147.

Figure 4B:
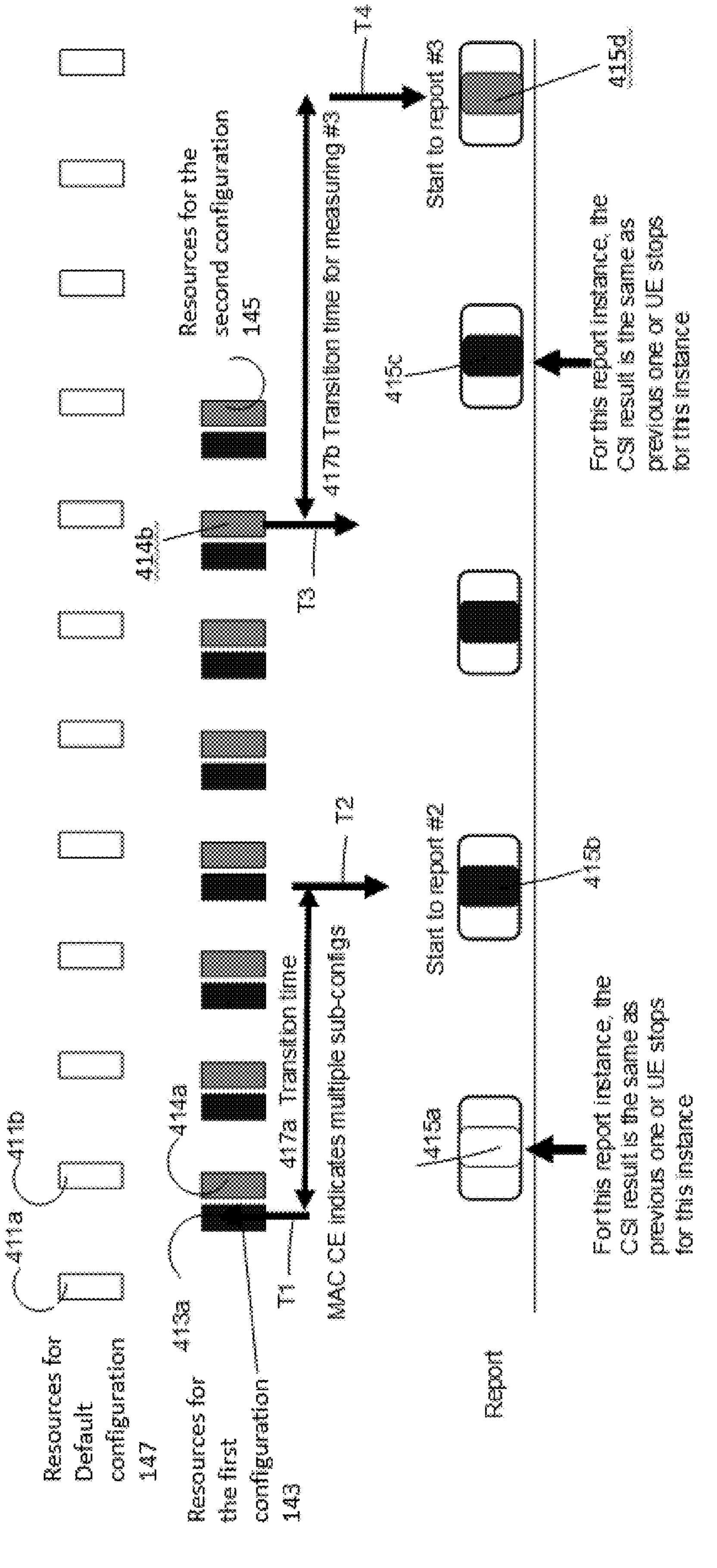

In some embodiments, as shown in FIG. 4B, various CSI-RS resources 411*a*, 411*b*, . . . can be configured by default configuration 147. CSI-RS resources 413*a* can be configured by the first configuration 143, and CSI-RS resources 414*a* can be configured by the second configuration 145. CSI-RS resources 411*a*, 411*b*, linked to the default report sub-configuration #1, which is default configuration 147, is a Periodic type. Similarly, CSI-RS resources 413*a* linked to sub-configuration #2, which is the first configuration 143, is also a Periodic type. Similarly, CSI-RS resources 414*a* linked to sub-configuration #3, which is the second configuration 145, is also a Periodic type. Initially, CSI-RS resources 413*a*, . . . , are configured by the first configuration 143, but are not activated until a time instance T1. At time instance T1, a MAC CE indicates the first configuration 143 is activated. Accordingly, the CSI report, such as CSI report 415*a*, transmitted by UE 102 to base station 101, is initially configured by default configuration 147. When CSI-RS resources 413*a* are activated at time instance T1 and after a transition time 417*a* at time instance T2, UE 102 completes the measuring of the CSI-resource 413*a*, and generates a CSI report 415*b* to be transmitted by UE 102 to base station 101. Furthermore, CSI-RS resources 414*b* can be activated at time instance T3. After a transition time 417*b*. at time instance T4, CSI report 415*d* can be generated based on a CSI resource configured by the second configuration 145.

Figure 4C:
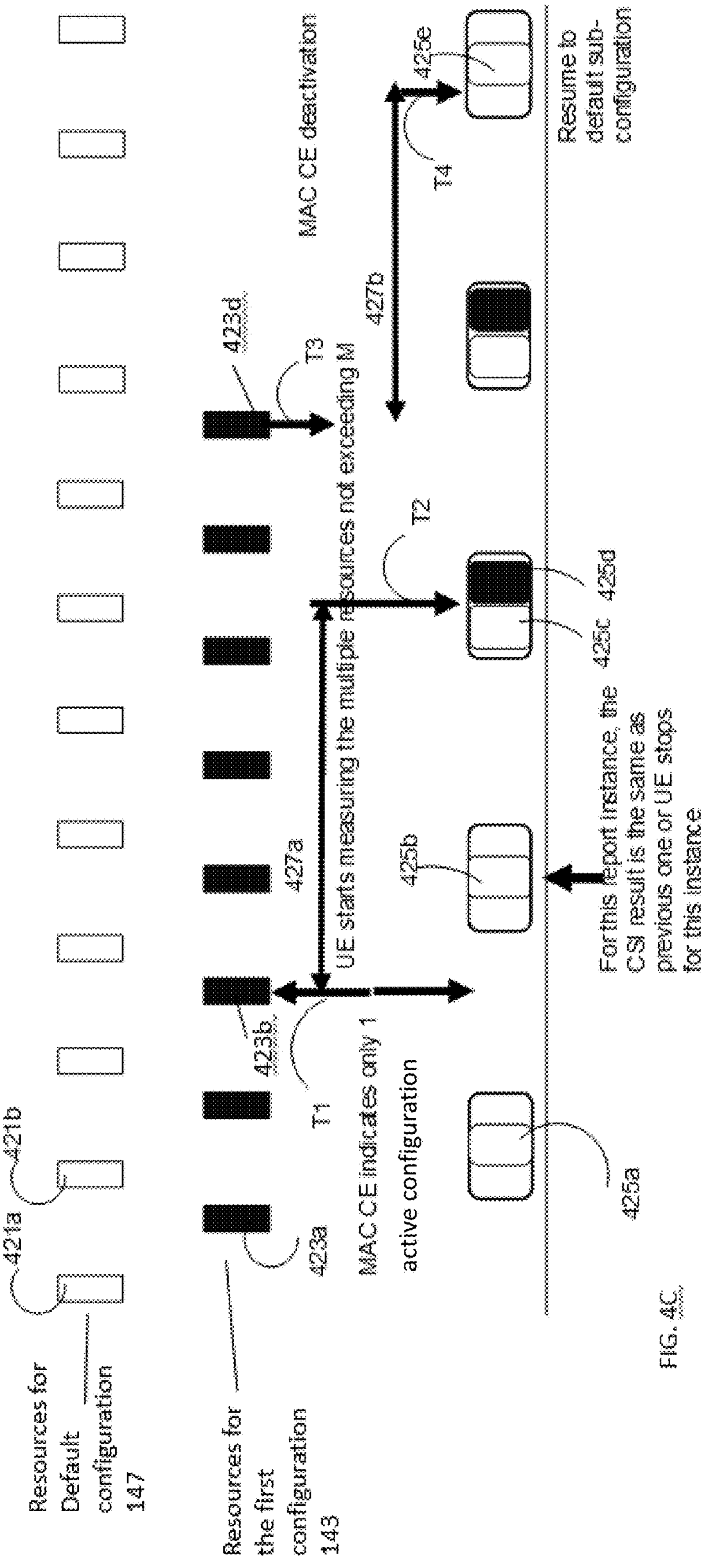

In some embodiments, as shown in FIG. 4C, various CSI-RS resources 421*a*, 421*b*, . . . , can be configured by default configuration 147. CSI-RS resources 423*a*, can be configured by the first configuration 143. CSI-RS resources 411*a*, 411*b*, linked to the default report sub-configuration #1, which is default configuration 147, is a Periodic type. Similarly, CSI-RS resources 423*a* linked to sub-configuration #2, which is the first configuration 143, is also a Periodic type. Initially, CSI-RS resources 423*a*, are configured by the first configuration 143 but not activated until a time instance T1. At time instance T1, a MAC CE indicates the first configuration 143 is activated. Accordingly, the CSI reports, such as CSI report 425*a* and 425*b*, transmitted by UE 102 to base station 101, are initially configured by default configuration 147. When CSI-RS resources 423*b* are activated at time instance T1 and after a transition time 427*a* at time instance T2, UE 102 has completes the measuring of the CSI-resource 423*b*, and generates a CSI report 425*d* to be transmitted by UE 102 to base station 101. In addition, multiple CSI reports are transmitted at the same time, including a CSI report 425*c* generated based on a CSI-RS resource configured by default configuration 147. Furthermore, CSI-RS resources 423*d* can be deactivated at time instance T3 after a transition time 427*b* at time instance T4. After which, CSI report 425*c* can be generated based on a CSI resource configured by default configuration 147, as CSI resource configured by the first configuration 143 is no longer available.

Figure 4D:
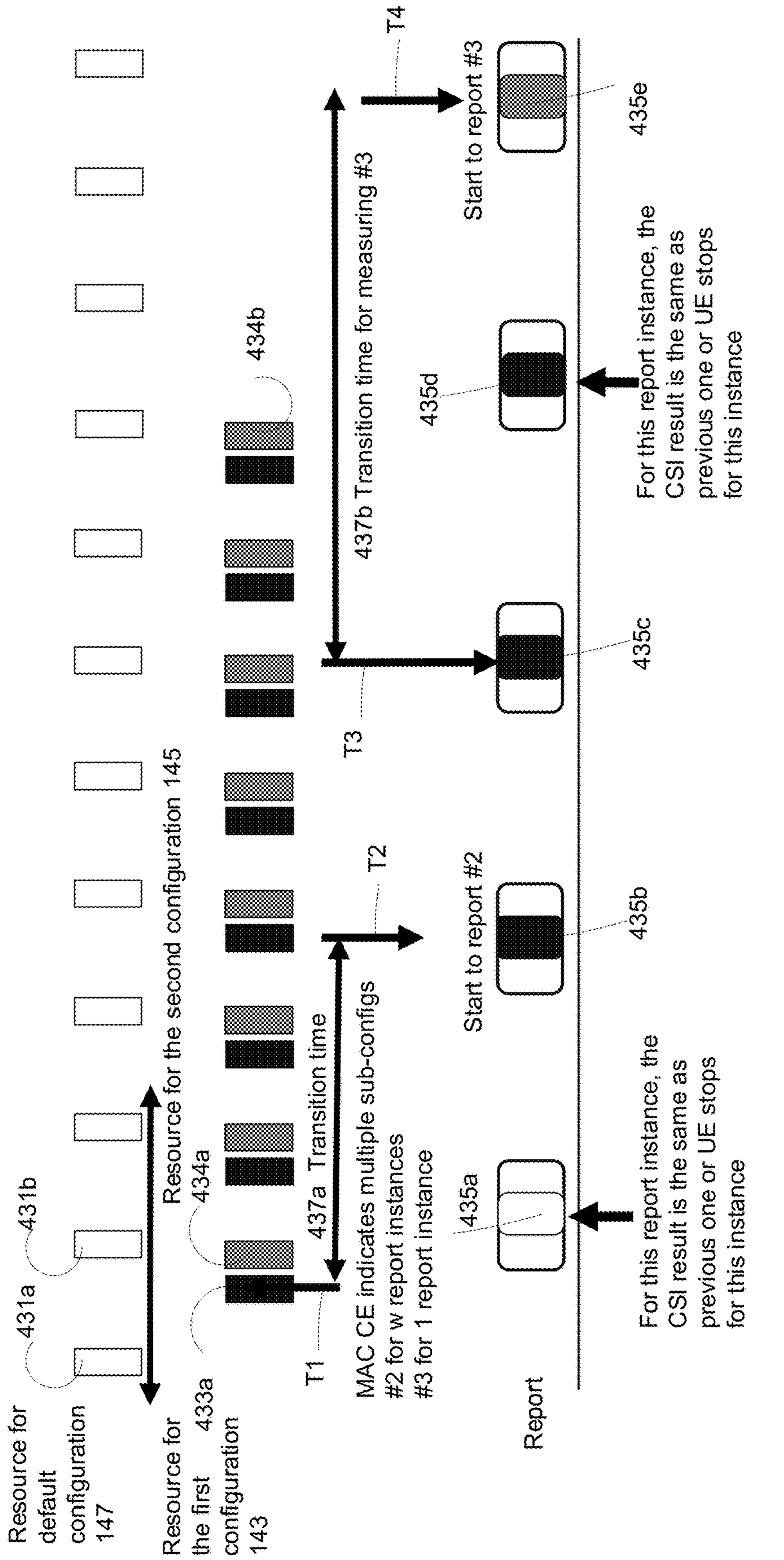

In some embodiments, as shown in FIG. 4D, various CSI-RS resources 431*a*, 431*b*, . . . can be configured by default configuration 147. CSI-RS resources 433*a* can be configured by the first configuration 143, and CSI-RS resources 434*a* can be configured by the second configuration 145. CSI-RS resources 431*a*, 431*b*, linked to the default report sub-configuration #1, which is default configuration 147, is a Periodic type. Similarly, CSI-RS resources 433*a* linked to sub-configuration #2, which is the first configuration 143, is also a Periodic type. Similarly, CSI-RS resources 434*a* linked to sub-configuration #3, which is the second configuration 145, is also a Periodic type. Initially, CSI-RS resources 433*a*, . . . , are configured by the first configuration 143, but are not activated until a time instance T1. At time instance T1, a MAC CE indicates the first configuration 143 is activated. Accordingly, the CSI report, such as CSI report 435*a*, transmitted by UE 102 to base station 101, is initially configured by default configuration 147. When CSI-RS resources 433*a* are activated at time instance T1 and after a transition time 437*a* at time instance T2, UE 102 completes the measuring of the CSI-resource 433*a*, and generates a CSI report 435*b* to be transmitted by UE 102 to base station 101. A time duration, transition time 437*a*, between a first time instance T1 when the first configuration 143 is activated by the MAC CE and a second time instance T2 when the first CSI report is transmitted to base station 101 is larger than at least a time duration for UE 102 to perform the CSI-RS measurements and the first CSI report generation. In some embodiments, the MAC CE can indicate multiple sub-configurations such as the first configuration 143 and the second configuration 145, as well as the numbers of report instances for each sub-configuration. UE 102 can report each sub-configuration sequentially by number of reports. For example, the MAC CE can indicate sub-configuration #2 for 2 report instances and sub-configuration #3 for 1 report instance, the UE will report at least 2 report instances for CSI report #2, shown as CSI report 435*b* and CSI report 435*c*. Starting from the end of the 2nd report of sub-configuration #2, which is marked as time instance T3, there is a transition time 437*b* for preparing for the report of sub-configuration #3, and report 1 report instance for sub-configuration #3, which is CSI report 435*e* transmitted at time instance T4. There is a transition time 437*b* between the time instance T3 and time instance T4. During transition time 437*b*, there can be a CSI report 435*d* which can be the same as CSI report 435*c*. In some other embodiments, UE 102 can choose not to send any report during transition time 437*b*.

In some embodiment, when report mode 146 is the enhance mode, if reportConfigType=Semi-persistent report type, UE 102 can have multiple report sub-configurations, such as the first configuration 143 and the second configuration 145, configured in the same CSI report configuration 141 with same time-domain behavior. UE 102 can determine which CSI report is fed back depending on a further indication. If reportConfigType=semiPersistent, the corresponding resource types for all the CSI-RS resources related to the sub-configurations can be P only, SP only, or P and SP combined. For the report in the enhanced mode, MAC CE or DCI could be used to indicate which CSI result will be reported, with following options to be considered.

In some embodiments, a default sub-configuration can be defined when there are no other active sub configurations indicated by MAC CE or DCI, and UE 102 can transmit a CSI report based on the default sub-configuration.

In some embodiments, as Option 1, when report mode 146 is the enhance mode, only one CSI result can be reported in one report instance. For example, MAC CE or DCI indicates only one report sub-configuration for reporting is allowed, and the previous report is automatically deactivated by the newly indicated report. $O_{CPU}$ is counted per report configuration.

In some embodiments, as Option 2, when report mode 146 is the enhance mode, only one CSI result can be reported in one report instance. However, MAC CE or DCI could also indicate multiple consecutive CSI results, and UE 102 can report them in consecutive reporting instances. The previous CSI report is automatically deactivated by the newly indicated CSI report. $O_{CPU}$ is counted per report configuration.

In some embodiments, as Option 3, when report mode 146 is the enhance mode, UE 102 will measure or compute simultaneously for at most M report sub-configurations, where M can be the maximum number of sub-configurations included in the CSI report configuration 141. $O_{CPU}$ is counted per activated sub-configuration.

In some embodiment, when report mode 146 is the enhance mode, if reportConfigType=Aperiodic report type, UE 102 can have DCI used to trigger the CSI report of a specific sub-configuration, and there is a transition time between the triggering DCI and the CSI report transmission. UE 102 may not monitor the corresponding CSI-RS resource if the report sub-configuration is not indicated to be reported.

In general, the enhanced reporting mode has various benefits. For example, the enhanced mode can provide more flexibility for network configuration, artificially create different reporting behaviors for the original report and the additional report, enable alternating reports between the two reports with a single reportConfigType, and save UE 102 measuring and reporting overhead. For example, when option 2 or option 3 for SP report type are considered, UE 102 does not simultaneously report both results. For option 2 for SP report type, the enhanced mode can enable an additional report with a higher priority than the original report. Accordingly, enhanced reporting mode can have a faster CSI report without increasing configuration overhead.

In some embodiments, a reportConfig can be configured with multiple reporting sub-configurations with same report- ConfigType. The allowed reportConfigType and corresponding resourceTypes can include the following examples. For reportConfigType=periodic (P), the corresponding resource types for all the CSI-RS resources related to these sub-configurations can be Periodic only. For reportConfigType=semi-persistent (SP) on PUCCH/PUSCH, the corresponding resource types for all the CSI-RS resources related to the sub-configurations can be P only, SP only, or P and SP combined. For reportConfigType=aperiodic (AP), the resource types can include all combinations of P, SP and AP.

In some embodiments, in basic reporting mode, once this reportConfig is configured, activated, or triggered, the corresponding CSI-RS resources can all be transmitted, activated, or triggered. Then the CSI results corresponding to the multiple spatial adaptation patterns will be fed back to base station 101 in the same reporting instance. For a report containing multiple sub-configurations for channel measurement in the basic mode, $O_{CPU}$ is counted per sub-configuration (instead of per configuration as in current technology).

Figure 5:
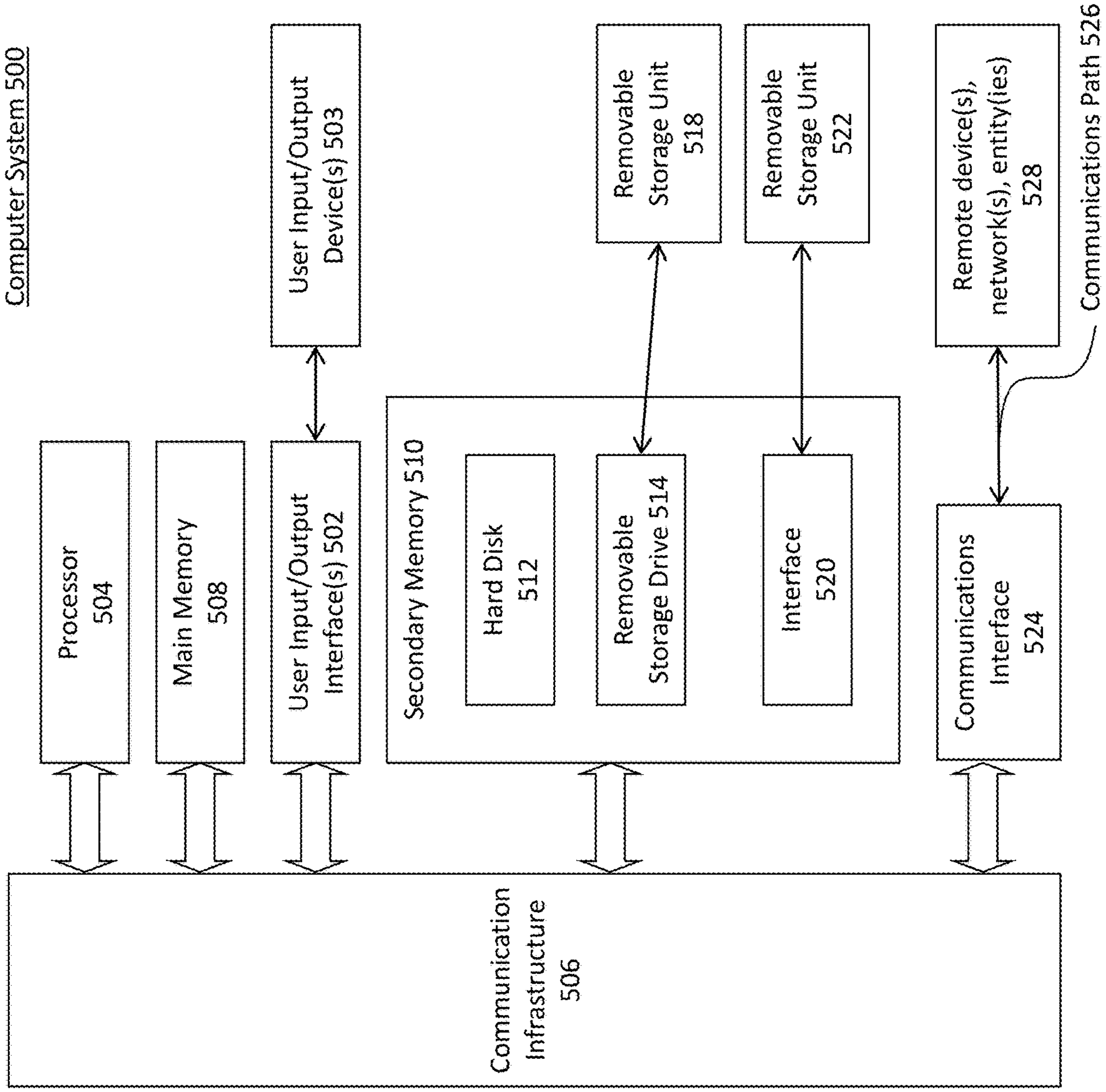
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the functions described herein such as UE 102 or base station 101 in FIG. 1, for operations described for processor 131 or process 300. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE, UE 102 or base station 101 in in FIG. 1, for operations described for processor 131 or process 300.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a UE, base station, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
- a transceiver configured to enable wireless communication with a base station in a wireless communication system; and
- a processor communicatively coupled to the transceiver and configured to:
  - receive a Channel State Information (CSI) report configuration indicating a first configuration to configure a first CSI report and a second configuration to configure a second CSI report, wherein the first configuration indicates a first CSI report type indicating time-domain attributes for the first CSI report and a first CSI reference signal (CSI-RS) resource to be monitored to generate the first CSI report, and the second configuration indicates a second CSI report type for the second CSI report and a second CSI-RS resource to be monitored for the second CSI report;
  - determine one or more active configurations selected from the first configuration and the second configuration, based on whether one or more of the first configuration or the second configuration is activated by a Medium Access Control (MAC) Control Element (MAC CE) or triggered by a Downlink Control Information (DCI);
  - select, based on a report mode, one or more CSI reports from the first CSI report and the second CSI report;
  - monitor CSI-RS resources based on the one or more selected CSI reports to perform CSI-RS measurements configured by the one or more active configurations;
  - generate the one or more selected CSI reports based on the CSI-RS measurements; and
  - transmit the one or more selected CSI reports to the base station.

2. The UE of claim 1, wherein the first CSI report provides a first CSI feedback from the UE in response to a first spatial adaption being applied by the base station, and the second CSI report provides a second CSI feedback in response to a second spatial adaption different from the first spatial adaption being applied by the base station.

3. The UE of claim 1, wherein:
- the first CSI report type is a periodic report type, and the first CSI-RS resource and the second CSI-RS resource are periodic;
- the first CSI report type is a semi-persistent report type, and the first CSI-RS resource and the second CSI-RS resource are periodic or semi-persistent; or
- the first CSI report type is an aperiodic report type, and the first CSI-RS resource and the second CSI-RS resource are one of periodic, semi-persistent, or aperiodic.

4. The UE of claim 3, wherein:
- the first CSI report type is the periodic report type, and wherein to transmit the one or more selected CSI reports to the base station, the processor is configured to transmit the one or more selected CSI reports periodically to the base station using a periodic CSI-RS resource;
- the first CSI report type is the semi-persistent report type, wherein to transmit the one or more selected CSI reports to the base station, the processor is configured to activate, based on the MAC CE, the first configuration or the second configuration for transmission of the one or more selected CSI reports; or
- the first CSI report type is an aperiodic report type, wherein to transmit the one or more selected CSI reports to the base station, the processor is configured to trigger, based on the DCI, the first configuration or the second configuration for one-time transmission of the one or more selected CSI reports.

5. The UE of claim 1, wherein the report mode includes a basic mode, and the one or more selected CSI reports include both the first CSI report and the second CSI report.

6. The UE of claim 1, wherein a time duration between a first time instance when the first configuration or the second configuration is activated by the MAC CE or the DCI and a second time instance when the one or more selected CSI reports are transmitted to the base station is larger than at least a time duration for the UE to perform the CSI-RS measurements and the one or more selected CSI reports generation.

7. The UE of claim 1, wherein the report mode includes an enhanced mode, and the one or more selected CSI reports include only the first CSI report, only the second CSI report, or both the first CSI report and the second CSI report.

8. The UE of claim 7, wherein the one or more selected CSI reports include only the first CSI report selected by the UE, and the processor is configured to monitor only the first CSI-RS resource to generate the first CSI report without monitoring the second CSI-RS resource, and wherein the one or more selected CSI reports include only the second CSI report and the processor is configured to monitor only the second CSI-RS resource to generate the second CSI report without monitoring the first CSI-RS resource.

9. The UE of claim 7, wherein the first CSI report or the second CSI report is further configured based on a default configuration, wherein:

to determine the one or more active configurations, the processor is configured to select the default configuration as an active configuration of the one or more active configurations when the first configuration or the second configuration is not activated by the MAC CE or triggered by the DCI, and to monitor the CSI-RS resources, the processor is configured to monitor a CSI-RS resource configured by the default configuration.

10. The UE of claim 9, wherein when the first configuration is activated by the MAC CE or triggered by the DCI, the processor is configured to determine the first configuration as the active configuration, and monitor a CSI-RS resource configured by the first configuration instead of the default configuration.

11. The UE of claim 7, wherein the one or more selected CSI reports include both the first CSI report and the second CSI report, and wherein the first CSI report and the second CSI report have same time domain attributes configured by a same reportConfig.

12. A method for wireless communications by a user equipment (UE) with a base station in a wireless system, comprising:

receiving a Channel Status Information (CSI) report configuration indicating a first configuration to configure a first CSI report and a second configuration to configure a second CSI report, wherein the first configuration indicates a first CSI report type indicating time-domain attributes for the first CSI report and a first CSI reference signal (CSI-RS) resource being monitored to generate the first CSI report, and the second configuration indicates a second CSI report type for the second CSI report and a second CSI-RS resource;

determining one or more active configurations selected from the first configuration and the second configuration, based on whether one or more of the first configuration or the second configuration is activated by a Medium Access Control (MAC) Control Element (MAC CE) or triggered by a Downlink Control Information (DCI);

selecting, based on a report mode, one or more CSI reports from the first CSI report and the second CSI report;

monitoring CSI-RS resources based on the one or more selected CSI reports to perform CSI-RS measurements configured by the one or more active configurations;

generating the one or more selected CSI reports based on the CSI-RS measurements; and transmitting the one or more selected CSI reports to the base station.

13. The method of claim 12, wherein the first CSI report provides a first CSI feedback from the UE in response to a first spatial adaption being applied by the base station, and the second CSI report provides a second CSI feedback in response to a second spatial adaption different from the first spatial adaption being applied by the base station.

14. The method of claim 12, wherein:

the first CSI report type is a periodic report type, and the first CSI-RS resource and the second CSI-RS resource are periodic;

the first CSI report type is a semi-persistent report type, and the first CSI-RS resource and the second CSI-RS resource are periodic or semi-persistent; or the first CSI report type is an aperiodic report type, and the first CSI-RS resource and the second CSI-RS resource are one of periodic, semi-persistent, or aperiodic.

15. The method of claim 12, wherein:

the first CSI report type is the periodic report type, and wherein the transmitting the one or more selected CSI reports includes transmitting the one or more selected CSI reports periodically to the base station using a periodic CSI-RS resource;

the first CSI report type is the semi-persistent report type, wherein the transmitting the one or more selected CSI reports includes activating, based on the MAC CE, the first configuration or the second configuration for transmission of the one or more selected CSI reports; or the first CSI report type is an aperiodic report type, wherein the transmitting the one or more selected CSI reports includes triggering, based on the DCI, the first configuration or the second configuration for one-time transmission of the one or more selected CSI reports.

16. The method of claim 12, wherein the report mode includes a basic mode, and the one or more selected CSI reports include both the first CSI report and the second CSI report.

17. The method of claim 12, wherein the first CSI report or the second CSI report is further configured by a default configuration, and the determining the one or more active configurations includes selecting the one or more active configurations from the default configuration, the first configuration, or the second configuration, based on whether the first configuration or the second configuration is activated by the MAC CE or triggered by the DCI.

18. The method of claim 12, wherein the report mode includes an enhanced mode, and the one or more selected CSI reports include only the first CSI report selected by the UE, only the second CSI report selected by the UE, or both the first CSI report and the second CSI report selected by the UE.

19. A non-transitory computer-readable medium storing instructions that, when executed by a processor of a user equipment (UE), cause the UE to perform operations, the operations comprising:

receiving a Channel Status Information (CSI) report configuration indicating a first configuration to configure a first CSI report and a second configuration to configure a second CSI report, wherein the first configuration indicates a first CSI report type indicating time-domain attributes for the first CSI report and a first CSI reference signal (CSI-RS) resource being monitored to generate the first CSI report, and the second configuration indicates a second CSI report type for the second CSI report and a second CSI-RS resource;

determining one or more active configurations selected from the first configuration and the second configuration, based on whether one or more of the first configuration or the second configuration is activated by a Medium Access Control (MAC) Control Element (MAC CE) or triggered by a Downlink Control Information (DCI);

selecting, based on a report mode, one or more CSI reports from the first CSI report and the second CSI report;

monitoring CSI-RS resources based on the one or more selected CSI reports to perform CSI-RS measurements configured by the one or more active configurations;

generating the one or more selected CSI reports based on the CSI-RS measurements; and transmitting the one or more selected CSI reports to the base station.

20. The non-transitory computer-readable medium of claim 19, wherein the first CSI report provides a first CSI feedback from the UE in response to a first spatial adaption being applied by the base station, and the second CSI report provides a second CSI feedback in response to a second spatial adaption different from the first spatial adaption being applied by the base station.

* * * * *